April 28, 1942.  C. W. STRAUBEL  2,281,463
DIVIDER FOR FILING DRAWERS
Filed June 6, 1941   6 Sheets-Sheet 1

Inventor
Clarence W. Straubel,
By Ochander & Groff
Attorneys

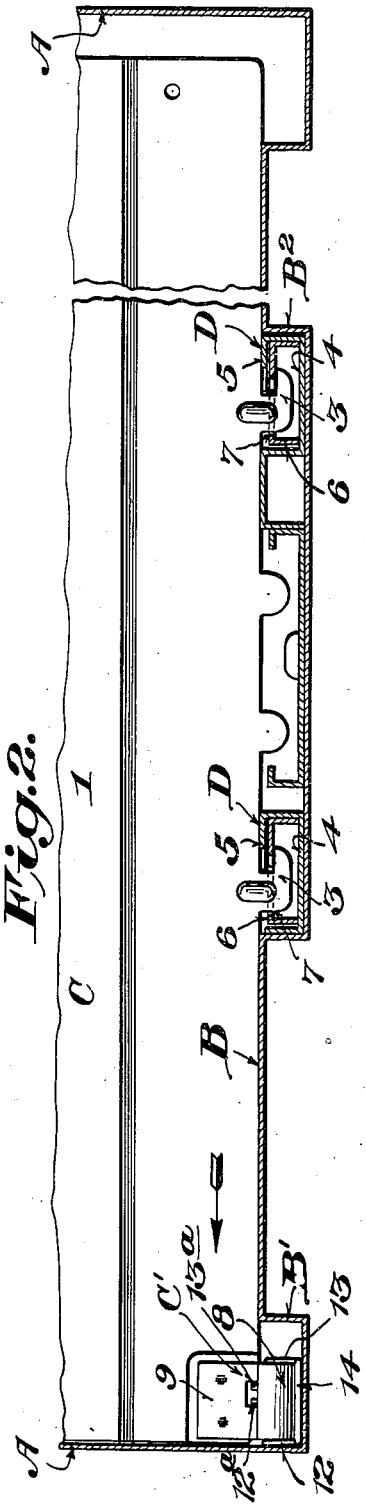

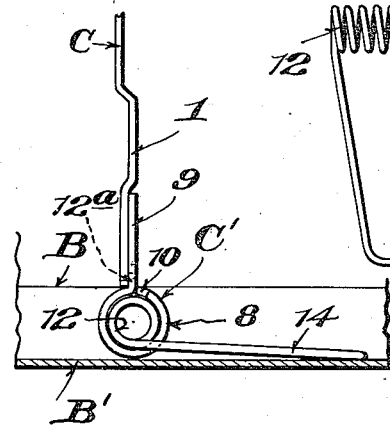
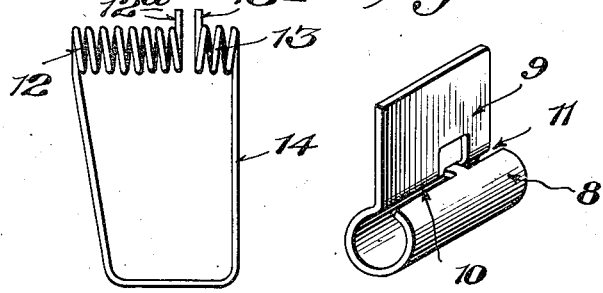
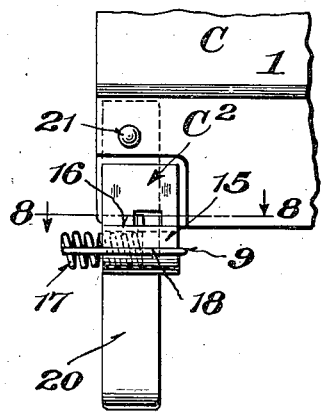
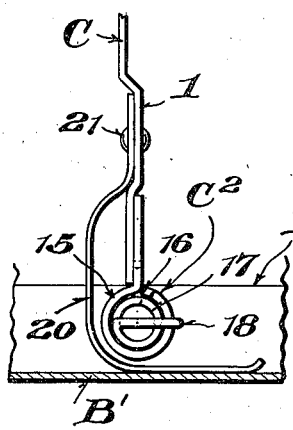
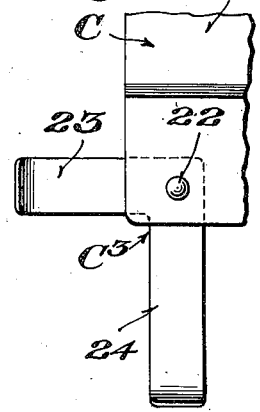
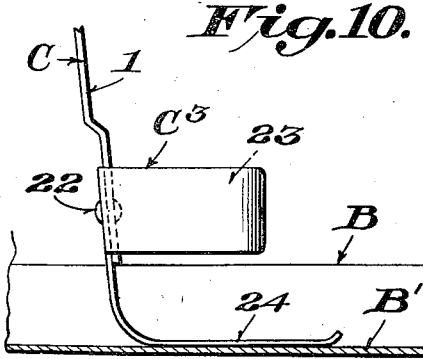
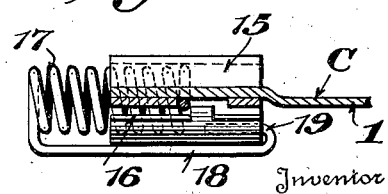

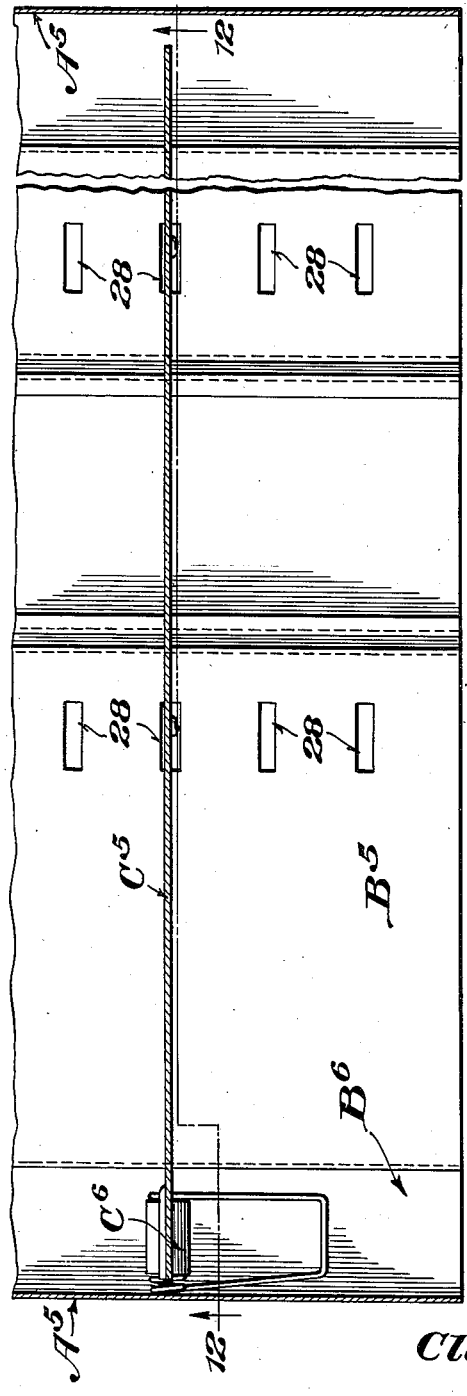
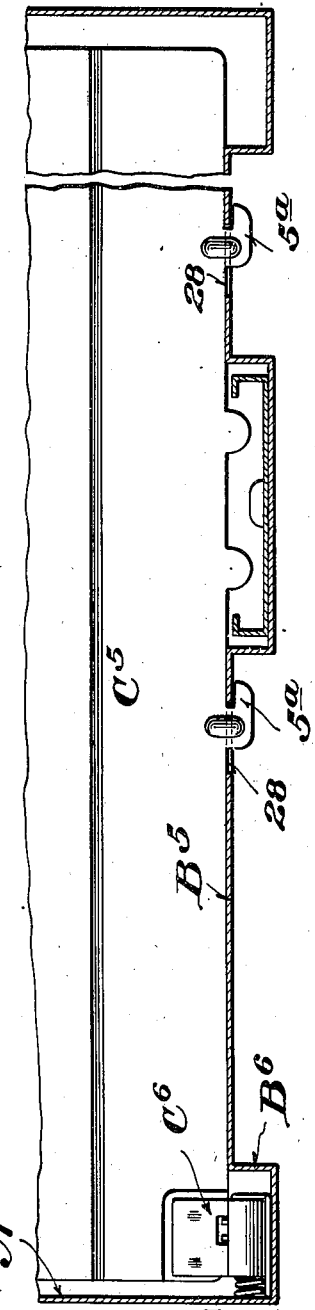

April 28, 1942.   C. W. STRAUBEL   2,281,463
DIVIDER FOR FILING DRAWERS
Filed June 6, 1941   6 Sheets-Sheet 5

Inventor
Clarence W. Straubel,
By Wachander Herr Groff
Attorneys

April 28, 1942. C. W. STRAUBEL 2,281,463
DIVIDER FOR FILING DRAWERS
Filed June 6, 1941 6 Sheets-Sheet 6
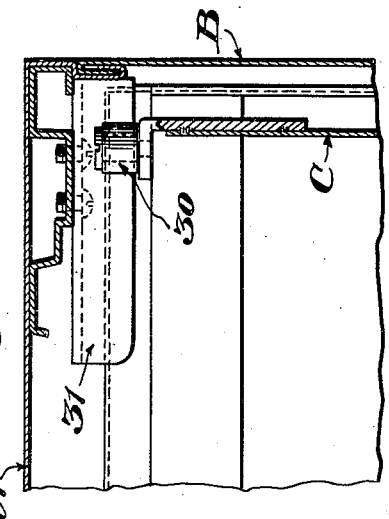
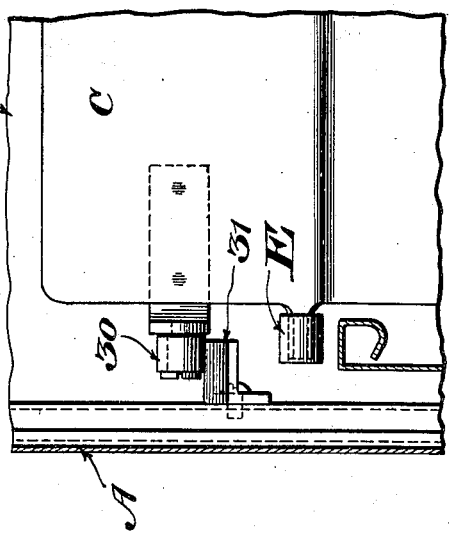
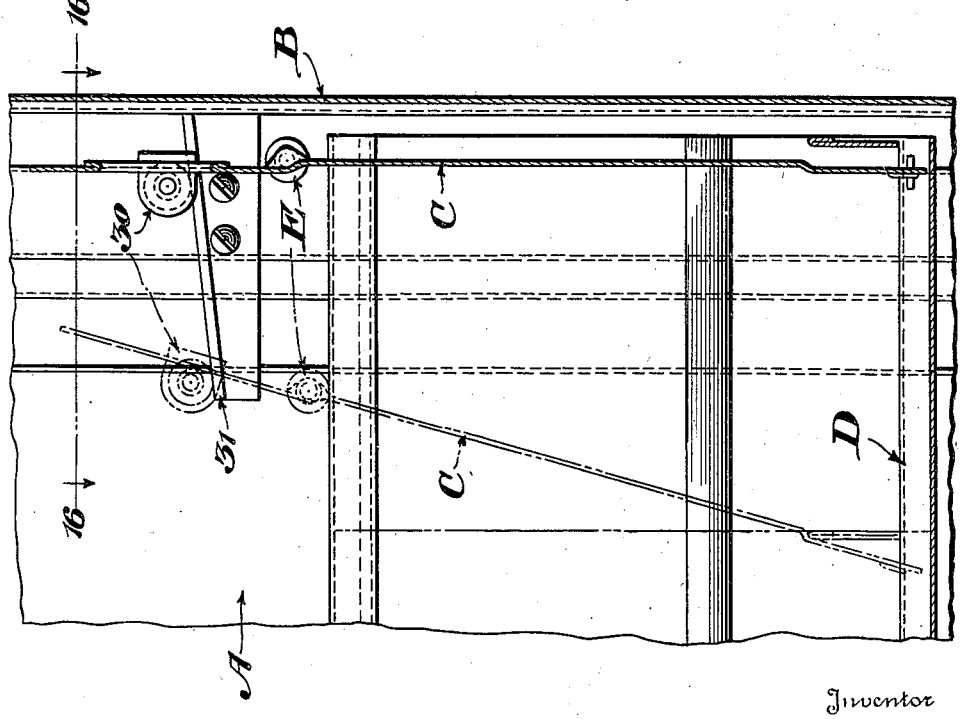
Inventor
Clarence W. Straubel,
By William Steen & Groff
Attorneys Patented Apr. 28, 1942

2,281,463

UNITED STATES PATENT OFFICE 2,281,463

DIVIDER FOR FILING DRAWERS

Clarence W. Straubel, Youngstown, Ohio, assignor to The General Fireproofing Company, Youngstown, Ohio, a corporation of Ohio Application June 6, 1941, Serial No. 396,953

13 Claims. (Cl. 129—16)

This invention relates to filing cabinets, and more particularly to an improved divider for subdividing the drawer space and assuming part of the load of the drawer contents when the drawer is either open or closed.

One of the general objects of the invention is to provide a divider which may be readily adjusted longitudinally of the drawer to selected locations to provide the desired sections or subdivisions in the contents of the drawer. In its primary aspect, the present construction contemplates a divider plate intended to cooperate with divider locater means disposed longitudinally of the drawer and having horizontally and transversely disposed holding elements on the order of a toothed rack, or transversely elongated slots in the drawer bottom, whereby the plate which is of less width than the distance between opposite side walls of the drawer may be manually moved transversely of the drawer to disengage said divider locater means, and then automatically urged transversely in the opposite direction to become locked in the selected position.

Another object of the invention is to provide novel spring means for automatically urging the plate transversely of the drawer into locked position.

A further and more specific object is to provide novel means for mounting the divider plate so it will freely slide in the drawer without binding and when disconnected from the divider locater means will not lift out of the drawer. That is to say, it is proposed to provide slotted sliding shoes to receive the locking lugs on the bottom of the divider plate which will not only hold said plate at right angles to the side walls of the drawer throughout its movement so that it will not twist, but also so that it will not become accidentally displaced vertically during adjustment.

A further object is to provide the plate with novel hold-down means cooperating with the upper edge portions of the drawer side walls to maintain the divider tilted rearwardly at the proper angle not only to better assume the load of the drawer contents but to also insure that the drawer contents assume an inclined position when the drawer is open, whereby the data on the filed material will be more easily readable.

A still further object of the invention is to provide cooperating means on the divider plate and the inside of the cabinet which will cause the erection of the divider plate automatically as it approaches the end of the drawer.

With the above and other objects in view which will more readily appear as the nature of the invention is better understood, the same consists in the novel combination and arrangements of parts hereinafter more fully described, illustrated and claimed.

A preferred and practical embodiment of the invention is shown in the accompanying drawings, in which:

Fig. 2 is a detail vertical cross-sectional view on the line 2—2 of Fig. 3 showing the position of the divider plate when it is manually shifted transversely of the drawer to disengage the plate from the divider locater means to permit longitudinal shifting of the plate in the drawer.

Fig. 3 is a detail horizontal cross section taken on the line 3—3 of Fig. 1 and illustrating the position of the divider plate relative to the divider locater means.

Fig. 4 is a detail vertical cross-sectional view taken on the line 4—4 of Fig. 1, illustrating one of the yielding side and throwback units for the divider plate.

Fig. 5 is a detail perspective view of the housing of the unit shown in Fig. 4.

Fig. 5ª is a detail plan view of the spring of Fig. 4.

Fig. 6 is a detail elevation of one corner of the divider plate showing a modified form of yielding side and throwback spring before the plate is assembled in the drawer.

Fig. 7 is a detail vertical sectional view of a portion of the drawer bottom showing the yielding side and throwback unit of Fig. 6 in elevation.

Fig. 8 is a detail horizontal section on line 8—8 of Fig. 6.

Fig. 9 is a detail elevation of a bottom corner of the divider plate showing a still further modified form of yielding side and throwback spring before it is positioned in the drawer.

Fig. 10 is a detail vertical sectional view of a portion of the drawer bottom showing the yielding side and throwback spring unit of Fig. 9 in elevation.

Fig. 11 is a detail plan view of a modified form of divider locater means.

Fig. 12 is a vertical section taken on line 12—12 of Fig. 11.

Figure 13:
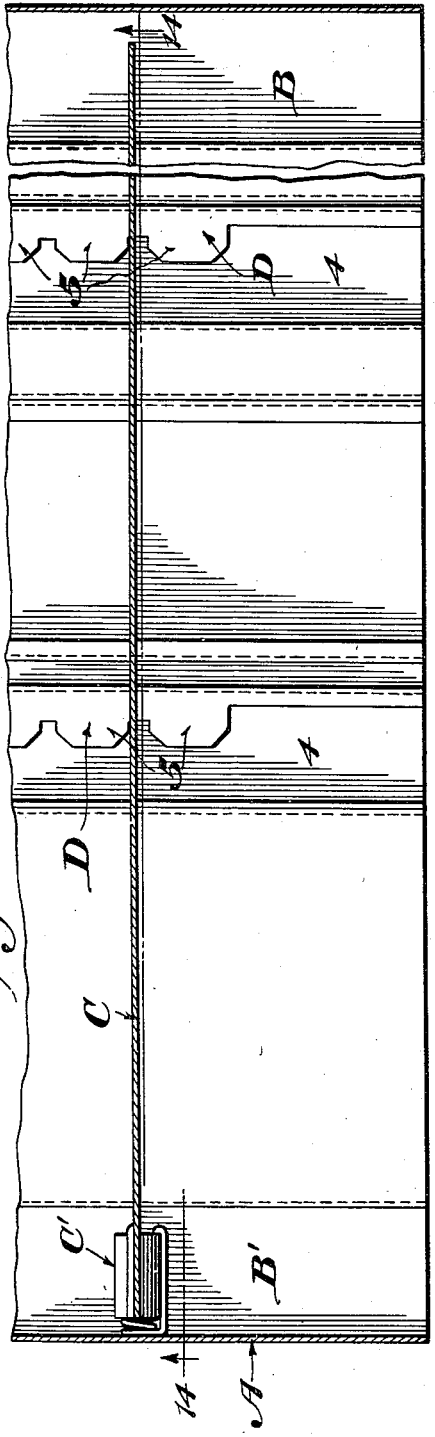

Fig. 13 is a top plan view of a portion of the bottom of the drawer illustrating the rack type divider locater means without sliding shoes.

Figure 14:
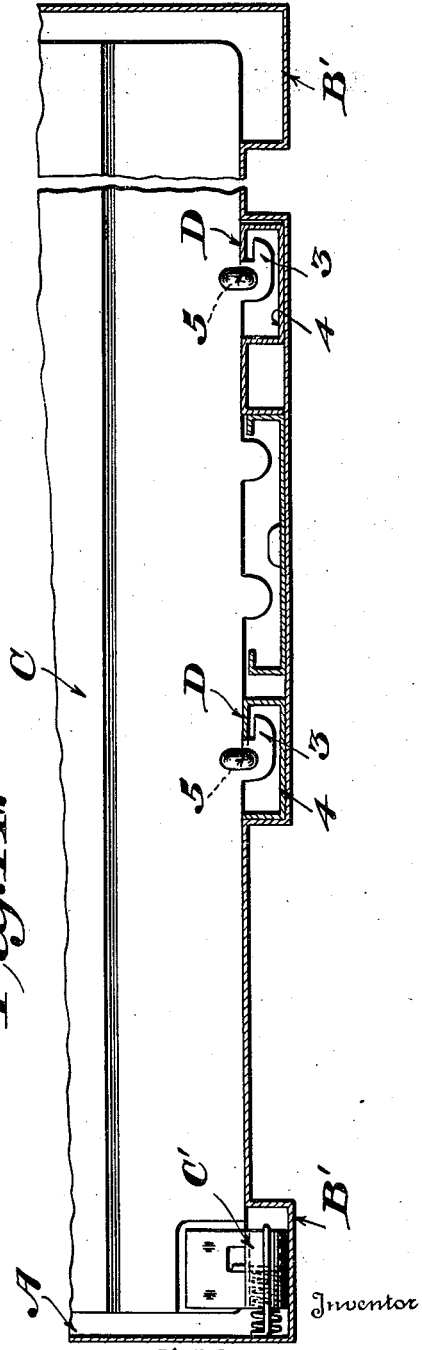

Fig. 14 is a detail vertical sectional view of the locater means of Fig. 13 illustrating the divider plate interlocked therewith.

Fig. 15 is a vertical sectional view of the drawer and a portion of the cabinet showing means for automatically causing the divider plate to assume an erect position as the drawer moves to closed position.

Fig. 16 is a detail plan view of the divider erecting means shown in Fig. 15.

Fig. 17 is a fragmentary front elevation of the parts shown in Fig. 16.

Figure 1:
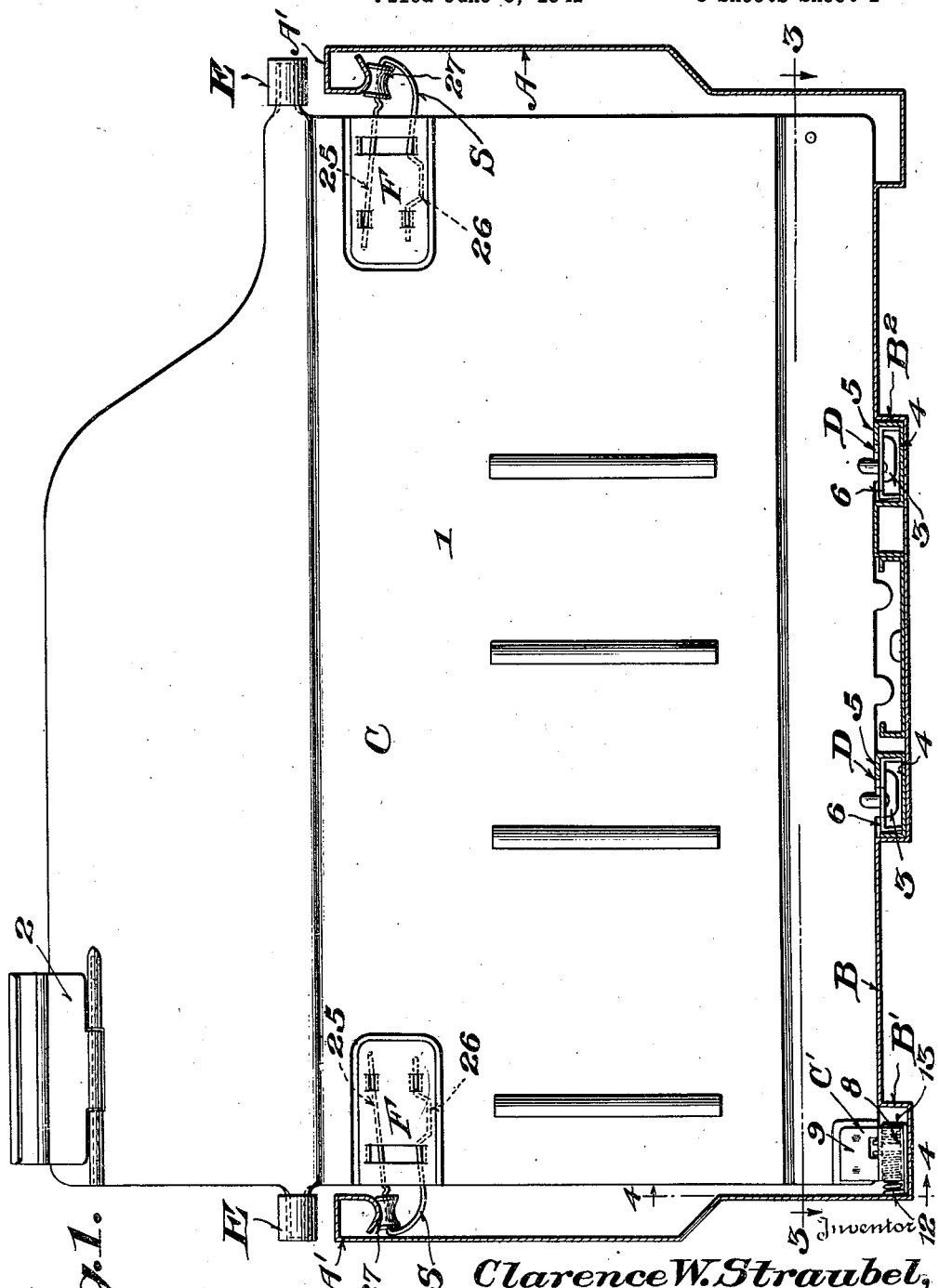
Fig. 1 is a vertical cross sectional view of a drawer showing the improved divider plate in elevation.

Referring to Fig. 1 of the drawings, it will be observed that the drawer is provided with the side wall A and bottom wall B, the latter being provided with a side channel B' and a medial channel B², while the upper edges of the side walls A are inwardly flanged or beaded as indicated at A'. The divider is designated in its entirety as C and preferably consists of a body plate 1 of less transverse width than the space between the side walls A—A of the drawer and of suitable height and contour to be visible above the side walls of the drawer and above the drawer contents. The plate of the divider is automatically urged laterally or sidewise by a spring unit C' into locking engagement with divider locater means D on the bottom of the drawer. The upper edge of the divider plate may be provided with an indicia receiving member or tab 2 of appropriate construction.

The bottom edge of the plate 1 is preferably provided with a pair of depending hook-like lugs 3, for reasons hereinafter explained, although it is entirely within the spirit and scope of the invention to utilize only a single hook-like lug 3. The said lugs 3 are intended to cooperate with said divider locater means D which extends longitudinally throughout the length of the drawer bottom B, unless, if at one end, part of the locater flange is removed to provide clearance spaces for easy insertion of a sliding shoe or shoes when these are to be used.

According to the construction shown in Fig. 3, the said divider locater means D preferably consists of one or more channel members 4, each having the upper edge of one of its side walls turned inwardly and provided with a rack formation 5 including alternate teeth and valleys disposed transversely of the drawer. The channels 4 and the racks 5 of the divider locater means are preferably arranged in the medial channel B² of the drawer bottom, as shown in Fig. 1, and both racks 5 have their teeth and alternate valleys disposed in the same lateral direction so that the hook-like lugs 3—3 on the bottom edge of the plate may engage and interlock selectively with any desired pair of valleys in the parallel pairs of racks.

While the racks 5 are formed on the channels 4, it is within the scope of the invention to form the racks on angle members which would partake of the nature of a longitudinally bisected channel. It will thus be understood that a fundamental feature of the invention resides in the provision of the racks 5, or their equivalent, which cooperate with the hook-like lugs 3 under the influence of one of the spring units C' to be held in a selected position in the drawer.

Although Figs. 1–3 show slotted shoes 6 in the channels 4 of the divider locater means beneath the rack portions 5, nevertheless it is to be understood that if desired, these shoes, which will presently be described, may be omitted entirely, as shown in Figs. 13 and 14. The lugs 3 will then cooperate with the rack teeth 5 only when automatically urged transversely by the pressure unit C'.

The said shoes 6 are preferably of inverted channel shape formation and are of sufficient width to have a sliding and guiding fit in the channels 4. In length these shoes are approximately equal to the distance of two of the teeth of the rack 5 and their top walls are provided with slots or openings 7 for receiving hook-like lugs 3 of the divider plate. The shoes 6 may be assembled on the lugs 3 before the shoes are placed in the channels 4 at the clearance spaces previously referred to. Although the slots 7 in the tops of the shoes are of sufficient length to permit entry of the hook-like lugs 3, nevertheless the ends of the slots 7 nearest the rack preferably do not extend as far as the depth of the valleys between the rack teeth, so that when the divider plate C is manually moved transversely in the drawer to permit the vertical shank of the lugs 3 to disengage and clear the rack teeth, the horizontal hook portion of the lugs will not come out of the slots 7 and thus prevent the operator from accidentally lifting the divider plate C out of the drawer when adjusting or shifting the same to a new location, (note Fig. 2).

As shown on the drawing, it is preferred to employ a pair of metal hook-like lugs 3 and a pair of divider locater elements D and shoes 6 for the purpose of preventing the twisting of the divider plate on a vertical axis during shifting. The use of parallel channels 4 and sliding shoes 6 contributes materially to easy and smooth shifting of the divider plate longitudinally of the drawer. On the other hand, it will of course be appreciated that the inventive features of the construction apply to only one divider locater and one shoe, or even the omission of the shoe or shoes altogether, so long as the other essential characteristics of the assembly are observed.

The bottom edge of the divider plate C rests on the drawer bottom B between the channels B' and B² and therefore the plate may rock or tilt forwardly and backwardly even though the lugs 3 are interlocked with the locater elements D. The extent of locking or tilting movement of the divider plate C is controlled by the bumper arms E on the sides of the divider plate engaging the upper edges of the side walls A' of the drawer.

Referring now more particularly to the yielding side pressure spring units employed for automatically urging the plate C transversely of the drawer to maintain the lugs 3 interlocked with the divider locater rack, it will be observed that several forms of construction for accomplishing this purpose may be employed. And, although the several embodiments herein shown act both as side pressure and throwback spring units, the throwback feature may be omitted so that the units function solely as a means for shifting the plate transversely of the drawer.

Referring first to Figs. 1 to 4 inclusive, it will be observed that the yielding side pressure unit or means C' is carried by the bottom corner of the plate C and operates within the side channel B' of the drawer bottom. This characteristic is true of all forms of side pressure spring units. The unit of Figs. 1 to 4 inclusive preferably consists of a hollow tubular housing or barrel 8, including a radially offset portion 9 adapted to be spot welded or otherwise secured to the bottom corner of the divider plate. The tubular housing 8 is preferably slotted longitudinally thereof inwardly from opposite ends, as indicated at 10 and 11, and receives the tubular side pressure spring. This spring preferably consists of a wire body having the opposite coiled ends 12 and 13 connected by a loop 14, and when said coils are fitted within the housing 8, the free ends 12a and 13a respectively fit in the notches or slots 10 and 11. When the intermediate loop 14 of the spring is moved in angular relation to the axis of the coils, the coils themselves will be tensioned and likewise the loop 14, resting on the bottom of the side channel B', is tensioned, thereby having a tendency to rock the divider plate C rearwardly within the limits provided by the offset bumper arms E and the flanges A'. The outer end of the coil portion 12 is intended to engage with the outer side wall of the channel B' of the drawer bottom, which side wall of course is a part of the side wall A of the drawer. It will thus be apparent that the yielding means 12—14 inclusive performs the function of automatically laterally urging the plate C so that the lugs 3 are held in engagement with the rack and also tensions the plate C so that it is normally tilted rearwardly within the limits provided by the cooperating elements A' and E.

Figs. 6 and 7 of the drawings illustrate a further modified form of side pressure and throwback spring unit $C^2$ wherein the tubular housing 15, carried by the bottom corner of the divider plate C, is provided with a single longitudinal notch 16 for receiving the free end of a coil 17 whose other free end parallels the outer face of the housing 15, as indicated at 18, so that the hook portion 19 may engage the inner end of the tubular housing. In assembling the coil spring 17 in the housing 15, it may be pointed out that the offset inner end of the spring may be threaded into the notch 16 and the coil compressed until the lug or arm 18 having the hook 18 (Fig. 8) moves far enough to permit the hook 19 to snap over the end of the housing opposite the entrance to the notch 16. When thus assembled, the coil 17 is locked to the housing so that the front end of the coil may yieldingly engage the side wall of the channel B' and thus provide the necessary side pressure for urging the divider plate C transversely of the drawer to maintain it interlocked with the rack 5. For the purpose of tilting the divider plate rearwardly a flat throwback spring 20 is employed. One end of the spring 20 is attached to the bottom corner of the plate, as indicated at 21, while the free end is intended to be bent beneath the barrel or housing 15 to engage with the bottom of the channel B', as shown in Fig. 4.

Figs. 9 and 10 of the drawings illustrate a further modified side and throwback spring unit $C^3$ wherein a flat spring of right-angular formation is employed. This spring is secured to the divider plate as indicated at 22, and has the side arm 23 for engaging side wall of the drawer above the channel B' and the bottom arm 24 for engaging the bottom of the channel, as indicated for example in Fig. 3. Thus, this modification illustrates how a simple spring, stamped from sheet spring steel, may be employed for exerting side pressure on the plate as well as rearward tilting pressure.

For the purpose of assisting and maintaining the divider plate in the proper tilted or inclined position, the yielding hold-down units F are provided at each side of the divider plate to engage beneath the interior flange or bead A' at the upper edge of the drawer sides. The said hold-down units each preferably comprise a substantially U-shaped spring S whose opposite arm portions 25 and 26 are suitably anchored to the rear face of the plate C by extrusions or other appropriate means. The upper arm 25 of the spring preferably carries a roller 27 for engaging with the rounded under surface of the flange or bead A' at the top of the drawer side. While the bumper arms E of the plate define the limit of tilting or angular movement of the plate C, nevertheless the spring supported roller 27 engaging beneath the flange or bead A' will prevent the plate from idly swinging or rocking when the drawer is pulled inwardly or outwardly, if there is no load resting on the plate, and, at the same time, the spring supported roller 27 always tends to maintain the plate at the proper inclination when the drawer is loaded so that the contents are supported at a convenient viewing angle.

By way of illustrating the range of application of the invention, reference may be made to Figs. 11 and 12 of the drawings. From these illustrations it will be observed that the divider plate $C^5$, having the downwardly depending hook-like lugs $5^a$, is intended to cooperate with divider locater means which consists of the slots 28 preferably arranged in parallel rows on the bottom wall $B^5$ of the drawer. Said drawer includes the side walls $A^5$ and the side channels $B^6$ for receiving the yielding side pressure and throwback units $C^6$, which may be of any of the types described herein. In this form of construction the hook-shaped lugs $5^a$ are normally urged by the unit $C^6$ transversely of the drawer to be held in locked position in the slots 28. When it is desired to reset the divider plate $C^5$ to a new location, the said plate is manually shifted against the yielding influence of the unit $C^6$ until the hook lugs $5^a$ completely clear the bottom wall of the drawer at the location of the slots 28, thereby making it necessary to lift the divider plate from the drawer in order to place it in a new position.

Figs. 15, 16 and 17 illustrate means for moving the divider plate to a substantially vertical or erect position when the same is located near the end of the drawer and the drawer is fully moved into the cabinet. That is to say, when the divider plate C is interlocked with the locater means D near the rear end of the drawer and the divider would thereby normally have its upper edge tilted beyond the back wall of the drawer, the said divider C may be moved upright through the medium of a roller or equivalent projection 30 carried by one or more of the side edges of the divider plate above the bumper E, said roller being adapted to engage a cam element 31 or the like carried by an inside wall of the cabinet. As shown, the cam element 31 is secured to one of the case uprights on the inner face of the side wall of the drawer, although the same result would be obtained if the said cam element 31 was carried by the rear wall of the cabinet or casing and disposed in the same general position and direction shown in Figs. 15 and 16.

From the arrangement shown in the figures now described, it will be apparent that it is possible to provide means carried by the interior of the cabinet intended to cooperate with means on the divider to move the latter to a substantially upright or vertical position when it is located near the rear end of the drawer and the latter is fully pushed in the cabinet. Thus, the drawer itself is not subjected to any continuing or persisting pressure that otherwise might exist between the inside face of the rear wall of the cabinet and the upper edge of the divider plate.

From the foregoing it will be apparent that in all forms of the invention the divider plate is urged transversely of the drawer to maintain it in a pre-selected set position. Likewise, in all forms of the invention the engagement of the divider plate with the divider locater means is effected by the hook-like lugs depending from the lower edge of the plate.

Without further description it is thought that the features and advantages of the invention will be readily apparent to those skilled in the art and it will, of course, be understood that changes in the form, proportion and arrangement of parts may be resorted to within the scope of the appended claims.

I claim:

1. A divider for filing drawers shiftable to selected locations longitudinally of the sides and bottom of the drawer, comprising, divider locater means extending medially throughout substantially the length of the drawer bottom, a divider plate, means on the plate for engaging said locater means, and yielding means carried by the plate and engaging a side wall of the drawer for normally urging said plate transversely of the drawer to maintain the same interlocked with said locater means.

2. A divider for filing drawers, shiftable to selected locations longitudinally of the sides and bottom of the drawer, comprising, divider locater means extending medially throughout substantially the length of the drawer bottom, a divider plate, means on the plate for releasably and rockably engaging said locater means, and yielding means normally pressing the plate transversely of the drawer and also tilting the divider plate rearwardly.

3. A divider for filing drawers including, in combination with the side and bottom walls of the drawer, a longitudinally disposed rack carried by the drawer bottom and having teeth disposed transversely of the drawer, a divider plate adjustable longitudinally of the drawer and having a hook-like lug depending from its bottom edge for selective automatic engagement with and manual disengagement from the teeth of the rack by shifting the plate transversely of the drawer, and yielding means carried by one side of the plate for engaging a side wall of the drawer automatically to urge the plate in a direction to keep the hook engaged with the rack.

4. A divider for filing drawers comprising, in combination, a drawer having side walls and a bottom wall, said bottom wall having a side channel and a medial channel, a divider locater rack located in said medial channel and having the valleys of the teeth laterally accessible, a divider plate of less with than the space between the side walls of the drawer and having a medially disposed hook-like lug depending from the bottom edge thereof for engaging beneath the rack at the valley between selected teeth to position the plate longitudinally of the rack, and yielding means carried by a bottom corner of the plate and slidable in the said side channel, said yielding means engaging the side wall of the drawer channel to shift the plate laterally of the drawer to maintain said lug engaged with the rack.

5. A divider for filing drawers comprising, in combination, a drawer having side walls and a bottom wall, said bottom wall having a side channel and a medial channel, an adjusting rack disposed in said medial channel and having the valleys of the teeth laterally accessible, a divider plate of less width than the space between the side walls of the drawer, and having a medially disposed hook-like lug depending from the bottom edge thereof for rockably and releasably engaging between and beneath the rack at a valley between selected teeth to position the plate longitudinally of the rack, cooperating means on the plate and drawer side to limit tilting movement of the plate, and yieldable means carried by a bottom corner of the plate and slidable in said side channel, said yielding means engaging the side wall of the drawer channel to shift the plate laterally of the drawer to maintain the lug engaged with the rack and also maintain the bottom edge of the divider engaged with the drawer bottom normally to tilt the plate rearwardly.

6. A divider for filing drawers comprising, in combination, a drawer having side walls and a bottom wall, said bottom wall having a side channel and a medial channel, a divider locater of channel-shaped cross section and having an inwardly projecting rack portion at the upper edge of one of the sides of the channel, the teeth of said rack being diposed transversely of the drawer, a divider plate of less width than the space between the side walls of the drawer and having a medially disposed hook-like lug depending from the bottom edge thereof, a shoe having a central opening to receive the lug on the plate, said shoe being slidable in the divider locater channel beneath the rack, the opening in the shoe and the valleys between the teeth of the rack being so dimensioned that when the hook-like lug is engaged with the shoe it may be shifted to clear the teeth of the rack and not become disengaged from the shoe, and means carried by a bottom corner of the plate and operating in the side channel of the drawer bottom to yieldingly push the plate transversely of the drawer to maintain the lug on the plate engaged with the teeth of the divider locater.

7. A divider for filing drawers comprising, in combination, a drawer having side walls and a bottom wall, said bottom wall having a side channel and a medial channel, a pair of divider locater elements disposed in parallel relation in said medial channel of the drawer bottom, said divider locater elements each consisting of a body of channel-shaped cross section and having a rack formed at the upper edge of one of the side walls of said channel-shaped body, said rack having its teeth disposed transversely of the drawer, shoes having top openings and slidable in the divider locater channels beneath the rack portions thereof, a divider plate of less width than the distance between the side walls of the drawer, a pair of hook-like lugs on the bottom edge of the plate entering the openings in the shoes and movable when the plate is moved transversely of the drawer to engage and disengage the said locater racks; said lugs, shoes and locater channels preventing the twisting of the plate about a vertical axis; and yielding means carried by one bottom corner of the plate and operating in the side channel of the drawer bottom, said means engaging the side wall of the channel to push the plate transversely of the drawer, thereby normally to interlock the lugs with the divider locater racks.

8. A divider for filing drawers, adjustable to selected locations longitudinally of the sides and bottom of the drawer, comprising divider locater means extending medially throughout substantially the length of the drawer, a divider plate disposed transversely of the drawer, means on the plate for engaging said locater means, cooperating means on the divider plate and drawer for limiting relative tilting movement of the plate, yielding means carried by the plate and cooperating with a side wall and bottom of the drawer to urge the divider plate transversely of the drawer and also tilt the plate rearwardly, said means comprising a tubular housing carried by the plate and having longitudinal notches therein, a wire spring coiled at both ends and having an offset loop, the coiled portions located within each end of the housing with the free ends of the spring anchored in said notches, one of said coiled ends engaging the side of the drawer to push the plate toward said divider locater means, and said loop engaging the bottom of the drawer to tilt the plate rearwardly.

9. A divider for filing drawers, adjustable to selected locations longitudinally of the sides and bottom of the drawer, comprising divider locater means extending medially throughout substantially the length of the drawer, a divider plate disposed transversely of the drawer, means on the plate for engaging said locater means, cooperating means on the divider plate and drawer for limiting relative tilting movement of the plate, yielding means carried by the plate and cooperating with a side wall and bottom of the drawer to urge the divider plate transversely of the drawer and also tilt the plate rearwardly, said means comprising a tubular housing carried by the plate and having a notch therein, a coil spring in said housing having one end anchored in said notch and having its other end extending along one face of the housing and formed with a hook to engage the edge of the housing opposite the entrance to said notch, said coil spring engaging a side wall of the drawer to urge the divider plate toward the divider locater, and a flat spring secured at one end to the plate and having its free end disposed at an angle beneath the bottom of the housing to engage the drawer bottom and tending to tilt the divider plate rearwardly.

10. A divider for filing drawers, adjustable to selected locations longitudinally of the sides and bottom of the drawer, comprising divider locater means extending medially throughout substantially the length of the drawer, a divider plate disposed transversely of the drawer, means on the plate for engaging said locater means, cooperating means on the divider plate and drawer for limiting relative tilting movement of the plate, yielding means carried by the plate and cooperating with a side wall and bottom of the drawer to urge the divider plate transversely of the drawer and also tilt the plate rearwardly, said means comprising flat spring arms secured to the bottom corner of the plate and disposed at right angles to each other respectively to engage the side and bottom of the drawer.

11. A divider for filing drawers comprising, in combination, a drawer having a bottom, divider locater means on said bottom, drawer sides each having an inwardly turned flange at their upper edges, a divider plate, means at the bottom of the plate for rockably and releasably engaging the plate with said divider locater means, offset bumper arms on the sides of the plate for engaging the tops of said flanges on the drawer sides to limit rocking movement of the plate, and yielding hold-down units carried by the sides of the plate below said bumper arms for engaging the under sides of said flanges to assist in maintaining the plate in a rearwardly tilted position.

12. A divider for filing drawers comprising, in combination, a drawer having a bottom, divider locater means on said bottom, drawer sides each having an inwardly turned flange at their upper edges, a divider plate, means at the bottom of the plate for rockably and releasably engaging the plate with said divider locater means, offset bumper arms on the sides of the plate for engaging the tops of said flanges on the drawer sides to limit rocking movement of the plate, substantially U-shaped wire springs having the free ends of said arms anchored to the plate, and a roller supported on one of the arms of each of said wire springs and engaging the under side of said flange on the drawer to assist in maintaining the plate in rearwardly tilted position.

13. A divider for filing drawers shiftable to selected locations longitudinally of the sides and bottom of the drawer, comprising, divider locater means extending throughout substantially the length of the drawer, a divider plate adjustable longitudinally of the drawer and having a depending hook-like lug for engagement and disengagement with said locater means, and yielding means normally urging the plate transversely of the drawer to maintain said hook-like lug engaged with said divider locater means.

CLARENCE W. STRAUBEL.